United States Patent Office 3,466,311
Patented Sept. 9, 1969

3,466,311
PREPARATION OF DIALKYLTIN OXIDES
Yutaka Mizuno, Osaka-shi, Tadashi Nishihara, Sakai-shi, Yutaka Shioyama, Suita-shi, Tsutomu Tsutsui, Osaka-shi, and Keiichi Murakami, Ibaragi-shi, Japan, assignors to Nitto Kasei Co., Ltd., Osaka, Japan, a corporation of Japan
No Drawing. Filed July 18, 1967, Ser. No. 654,051
Claims priority, application Japan, July 18, 1966, 41/46,537
Int. Cl. C07f 7/22
U.S. Cl. 260—429.7         3 Claims

ABSTRACT OF THE DISCLOSURE

In accordance with certain of its aspects the process of this invention for producing dialkyltin oxides comprises washing a crude dialkyltin diiodide with a 5–37% aqueous solution in hydrochloric acid, and hydrolyzing the purified dialkyltin diiodide with an alkaline solution thereby to produce a high purity dialkyltin oxide. These dialkyltin oxides are useful for preparing stabilizers for polyvinyl resins.

---

This invention relates to a process for producing high purity dialkyltin oxide from dialkyltin diiodide.

Dialkyltin oxides, which are important as raw material to produce stabilizers for vinyl chloride resins are produced usually from dialkyltin diiodides, and the dialkyltin diiodide is produced solely in the present state of things by the direct reaction of alkyl iodides and metallic tin in the presence of catalyst (e.g. metallic magnesium and butanol together or amine singly). The dialkyltin diiodide produced by this procedure contains lots of by-products or impurities such as alkyltin triiodides, trialkyltin iodides, inorganic substances (e.g. unreacting metallic tin, $SnI_2$, $SnI_4$, etc.), and insoluble solid matters.

It has been proposed in Kagaku no Ryoiki or Journal or Japanese Chemistry 18, 1043 (1964) to manufacture high purity dialkyltin oxides from these impure dialkyltin diiodide by the process comprising the steps of (1) hydrolyzing the crude dialkyltin diiodide with an alkaline solution while distilling off excess alkyl iodides and water azeotropically thereby to produce crude alkyltin oxides;
(2) dissolving said crude alkyltin oxide in hydrochloric acid thereby to obtain alkyltin chloride;
(3) distilling said alkyltin chloride under vacuum; and
(4) dissolving the distillates in organic solvent, and re-hydrolyzing said distillates with alkaline solution thereby to yield the refined dialkyltin oxides in solid form, the by-product, alkyltin triiodide formed in step 1 being recovered in the shape of monoalkyltin oxide, and the trialkyltin oxide in step 4 recovered from the waste lye.

The process has many disadvantages in that, for example, in step 1, since the partial alkyl iodides and alcohol (catalyst) become the corresponding alcohol or ether by the hydrolysis in the presence of the alkaline solution, they are lost dissolving in the water of reaction; that the alkyl iodides recovered by azeotropic distillation may not be used in another reaction without their further refining; that the re-hydrolysis without step 3 of the crude alkyltin chloride may not give the dialkyltin oxide as pure as usable as raw material for stabilizer; that the distillation in step 3 causes some loss of organic tin portions in the form of residue due to thermal decomposition of alkyltin chlorides; and in that this laborious, time consuming process causes a limitation of productivity as well as loss of organic tin portions, and the product costs much. We, inventors have achieved success in eliminating these defects after studying of the above described refining process over a long space of time.

In accordance with certain of its aspects the process of this invention for producing diakyltin oxides comprises washing a crude dialkyltin diiodide with a 5–37% aqueous solution in hydrochloric acid, and hydrolyzing the purified dialkyltin diiodide with an alkaline solution thereby to produce a high purity dialkyltin oxide.

According to this invention, a high purity dialkyltin oxide may be obtained by the process which comprises recovering first an unreacting alkyl iodide and an alcohol from a crude dialkyltin diiodide by vacuum distillation, washing the concentrates with hydrochloric acid, dissolving the washed dialkyltin diiodide in organic solvent, and hydrolyzing the solution with alkaline solution. It may be considered that the unpureness of the dialkyltin oxide obtained in step 1 by the aforementioned prior art method is attributed to the formation of oxides such as $Mg(OH)_2$ and $SnO_2$ by the secondary hydrolysis with the alkaline solution of the catalysts such as magnesium and amine, the inorganic compounds such as $SnI_2$ and $SnI_4$, and the unreacting metallic tin. Therefore, high purity dialkyltin oxides may not be obtained without going through aforementioned steps 2–4. According to this invention, dissolved in hydrochloric acid, such substances that are the cause of impure product, and alkyltin triiodides may all be removed, and consequently the prior art process may be far simplified. Further, according to the invention, excess alkyl iodides and alcohol (catalyst) may be recovered in pure state, and the organotin compounds treated with hydrochloric acid may be filtered effortlessly to remove impure solid matters. Moreover, the amount of alkaline solution used may be cut down as a result of one time hydrolysis-with-alkaline-solution process.

The concentration of hydrochloric acid employed in the invention is 5–37% (by weight), and the amount used depends upon the concentration. For example, 120 g. of crude dibutyltin diiodide may be washed efficiently with 80 g. of 20% hydrochloric acid one time. The so-used hydrochloric acid waste liquor is re-used after to precipitate alkyltin oxides and tin oxides by neutralizing with it the waste liquor which ensues from the hydrolysis with alkaline solution of washed iodide. The alkyltin compounds treated with hydrochloric acid are dissolved in a solvent, e.g. trichloroethylene, toluene, methanol, acetone, etc., and then hydrolyzed with alkaline solution to yield pure white dialkyltin oxides.

Dialkyltin diiodides employed in the invention include, for example, dimethyltin diiodide, dibutyltin diiodide, and dioctyltin diiodide.

The stabilizer compositions which are produced from the dialkyltin oxides obtained by the technique of the invention are light and heat stabilizers for vinyl chloride as good as those which are produced from the dialkyltin oxides obtained by the prior art method (aforementioned steps 1–4). In the following two examples, the stabilizers were tested as under. To a resinous composition containing 100 parts by weight of polyvinyl chloride resin (Geon 103 Ep) and 5 parts by weight of dioctyltin phthalate as plasticizer, 2 parts by weight of dialkyltin maleate (produced from the dialkyltin oxides) was added as a stabilizer. The mixture was blended for 5 minutes on a mixing roll heated to 170° C., and was made into sheet 0.8 mm. thick. The sheets were laminated in 8 layers at 150 kg./cm.² and 180° C. for 15 minutes to test them for heat stability. The laminated sheet was then tested in a fadometer (Toyo Rika Instruments Inc., Japan) for light stability, being irradiated for 200 hours.

Example 1

A separating funnel was charged with 490 g. of dibutyltin diiodide concentrates which were obtained upon the direct reaction of 552 g. of butyl iodide with 118.7 g. of metallic tin, and 120 cc. of 37% HCl, and was shaken well to remove impurities. The so-treated dibutyltin diiodide was washed with water several times; dissolved in 100 cc. of trichloroethylene; and the solution dropped in a mixing solution consisting of 120 g. of caustic soda, 700 cc. of water, and 200 cc. of trichloroethylene in the atmosphere of nitrogen at 75° C. After cooling to about 10° C. to about 15° C., dibutyltin oxides which precipitated were filtered, washed with water, and dried. The yield of the product was 208 g. (84.0%). The trichloroethylene was distilled off from the lower layer to obtain 12.2 g. (4.1%) of bis-(tributyltin) oxide. The upper layer (waste caustic soda liquid) was neutralized with the waste hydrochloric acid liquid which formed in the first step of this process, and precipitates formed were filtered and dried to obtain 19.4 g. (9.7%, calculated as monobutyltin oxide) of oxides. The yield of these organotin oxides was 97.8% in total. The analysis of the so-obtained dibutyltin oxide is as follows:

Calculated (percent): C, 38.55; H, 5.62; Sn, 47.67. Found (percent): C, 38.49; H, 5.51; Sn, 47.63.

The above analysis shows that the purity of the product is not less than 99.8%.

Treating of crude dibutyltin diiodides with (1) 240 cc. of 20% HCl or (2) 500 cc. of 10% HCl also led to the same result as with 120° cc. of 37% HCl in the aforesaid process of production.

The same dibutyltin diiodide concentrates were treated by the prior art method in accordance with aforementioned steps 1–4 thereby to yield 81.3% of product dibutyltin oxide, 3.8% of by-product bis-(tributyltin) oxide, and 8.9% of by-product monobutyltin oxide. The yield of these organotin oxides was 94.0% in total.

Both stabilizers prepared from such dibutyltin oxides had quite the same good stabilizing effect.

Example 2

A separating funnel was charged with 605 g. of di-n-octyltin diiodide concentrates which were obtained upon the direct reaction of 720 g. of n-octyl iodide with 118.7 g. of metallic tin, and 250 cc. of 20% HCl, and was shaken well. The so-treated di-n-octyltin diiodide was treated by the same process as in Example 1 except that di-n-octyltin diiodide washed with water was dissolved in 100 cc. of methanol. The yields of product and by-products are as follows:

Di-n-octyltin oxide _____ 293 g. (81.1%)
Bis-(tri-n-octyltin) oxide _____ 59.0 g. (12.3%)
Mono-n-octyltin oxide _____ 7.7 g. (3.0%)

Total _____ 359.7 g. (96.4%)

The analysis of the di-n-octyltin oxide is as follows:
Calculated (percent): C, 53.20; H, 9.49; Sn, 32.86. Found (percent): C, 53.09; H, 9.41; Sn, 32.75.

The above analysis shows that the purity of the product is not less than 99.5%.

The same di-n-octyltin diiodide concentrates were treated by the prior art method in accordance with aforementioned steps 1–4 thereby to yield 79.2% of di-n-octyltin oxide, 10.7% of bis-(tri-n-octyltin) oxide, and 3.9% of mono-n-octyltin oxide. The yield of these organotin oxides was 93.8% in total.

Both stabilizers prepared from such di-n-octyltin oxides had the same good stabilizing effect.

We claim:
1. A process for the production of high purity dialkyltin oxides by the hydrolysis of dialkyltin diiodide with alkaline solution which comprises washing crude dialkyltin diiodide with a 5–37% aqueous hydrochloric acid solution prior to said hydrolysis.
2. A process as claimed in claim 1 wherein said dialkylatin diiodide is a dibutyltin diiodide.
3. A process as claimed in claim 1 wherein said dialkyltin diiodide is a di-n-octyltin diiodide.

References Cited
UNITED STATES PATENTS

| | | | |
|---|---|---|---|
| 2,569,492 | 10/1951 | Passino et al. | 260—429.7 |
| 3,082,230 | 3/1963 | Dorfelt et al. | 260—429.7 |
| 3,100,215 | 8/1963 | Gelbert | 260—429.7 |
| 3,390,159 | 6/1968 | Katsumura et al. | 260—429.7 |

FOREIGN PATENTS

| | | |
|---|---|---|
| 797,976 | 7/1958 | Great Britain. |
| 1,039,333 | 8/1966 | Great Britain. |

TOBIAS E. LEVOW, Primary Examiner

W. F. BELLAMY, Assistant Examiner